2,944,006

HYDROCRACKING OF A HYDROCARBON DISTILLATE EMPLOYING A SULFIDE OF NICKEL OR COBALT, DISPOSED ON AN ACTIVE SILICEOUS CRACKING CATALYST SUPPORT

John W. Scott, Jr., Ross, Calif., assignor to California Research Corporation, San Francisco, Calif., a corporation of Delaware No Drawing. Filed Oct. 29, 1959, Ser. No. 849,441

15 Claims. (Cl. 208—109)

This invention relates to a hydrocarbon conversion process and, more particularly, to a process for the catalytic conversion of petroleum distillates to products boiling lower than the distillates fed.

More specifically, this invention is directed to the application of a particular hydrocarbon conversion process to an essentially nitrogen-free hydrocarbon fraction of selected boiling range and composition to produce a high octane gasoline blending stock directly and/or a reformer feed which, upon catalytic reforming, results in a high octane gasoline blending stock. This process involves a critical correlation of process variables to accomplish a conversion in which the reactions of disproportionation, selective cracking, and "paring" predominate. The term "paring" is used herein to describe a reaction wherein methyl groups are "pared" or removed from the side chains of alkylcyclic hydrocarbons to form branched-chain paraffins, principally in the $C_4$–$C_6$ range. The new process is conducted in the presence of hydrogen and of a selective catalyst composition incorporating particular hydrogenating components dispersed on a highly active, solid, acidic support at elevated pressures and relatively low temperatures, resulting in a substantial consumption of hydrogen. The process can be considered generally to involve low temperature, selective hydrocracking, including production of light isoparaffins by the aforementioned paring reaction. For convenience and descriptiveness, the process of the invention will hereinafter be referred to as the isocracking process.

The present process, directed to the preparation of a high octane gasoline blending stock and/or a reformer feed which, on reforming, yields a high octane gasoline, comprises contacting, in an isocracking zone, a hydrocarbon distillate stock boiling within the range of from about 320° to about 850° F. and having a total nitrogen content of less than 10 p.p.m., along with at least 1500 s.c.f. of hydrogen per barrel of feed, with an isocracking catalyst. The catalyst comprises from about 0.1 to about 35.0 percent by weight (as metal) of the total catalyst of nickel sulfide and/or cobalt sulfide as a hydrogenating component dispersed on a solid, active, acidic support. The contacting step in the isocracking zone is effected at hydrogen partial pressures of at least 350 p.s.i.g. and at temperatures below about 700° F. The reaction in the isocracking zone is characterized by the consumption of at least 500 s.c.f. of hydrogen per barrel of feed converted to products boiling below the initial boiling point of the original feed. The phrase "products boiling below the initial boiling point of the feed," as used herein, means products whose 95% point is below the 5% point of the feed under the same conditions of distillation.

Feeds that have been found to be suitable include those generally defined as naphthas (those boiling above about 320° F.), kerosenes, gas oils, cycle oils, and the like. These can be of straightrun origin, as obtained from petroleum, or they may be derived from various processing operations and, in particular, from thermal or catalytic cracking of stocks obtained from petroleum. It is also within the scope of the present invention to employ feed stock derived from such sources as shale, gilsonite, and the like.

In general, it is preferred that the feed stocks of the present invention boil in the range of from about 320° to 650° F. However, in view of the applicability of the isocracking process to produce gasoline and/or reformer feeds, certain feed stock preferences as to composition and boiling range exist, depending upon the desired product. These preferences are discussed hereinafter under the headings "Preferred operation of the isocracking process for the production of reformer feeds" and "Preferred operation of the isocracking process for the direct production of high road octane gasoline blending stocks."

One of the important variables in the conduct of the present process which has a material effect and permits the production of the desired products is the control of the nitrogen content of the charge stock. As indicated, the nitrogen level, expressed as total nitrogen, should be below about 10 p.p.m., although appreciably improved results are obtained if the nitrogen content is reduced to levels below 2 p.p.m., and this latter figure is preferred as the upper limit on nitrogen content of the feed. These low nitrogen levels may be reached by subjecting the feed stock to a pretreatment that is relatively selective for the removal of nitrogen compounds. For example, the feed can be intimately contacted with various acidic media such as liquid acids ($H_2SO_4$, etc.) or, in the case of feeds that are comparatively low in nitrogen compounds but still in excess of 10 p.p.m., with such solid acidic materials as acid ion exchange resins and the like. However, it is preferred to carry out denitrification by catalytic hydrogenation (hydrofining) of the feed. The selected feed stock and hydrogen are contacted at elevated temperature and pressures with a hydrogenating catalyst which has little cracking activity under the conditions employed.

In general, the effect of a total nitrogen content in excess of 10 p.p.m. is a reduction in catalyst activity which is reflected in both operational efficiency and poorer product distribution. As the nitrogen content increases above the specified maximum, higher reaction temperatures are necessary to maintain an economic per-pass conversion level. These higher reaction temperatures cause a disproportionate increase in the amount of product converted to light gases and carbonaceous residues deposited on the catalyst surface and thus further decrease catalyst activity. Such further decrease in catalyst activity must be compensated for by resort to still higher operating temperatures if acceptable conversion is to be maintained and, thus, the on-stream life of the catalyst is shortened as limiting temperatures of about 700° F. are reached much sooner than would otherwise be the case.

The marked effect of nitrogen upon the isocracking reactions is in sharp contrast to that observed in conventional hydrocracking operations, which are conducted at temperatures above 800° F. In such operations, the effect of nitrogen in the feed, even when present in substantial amounts, is quite small at reaction temperatures of about 800° F. and becomes scarcely noticeable at temperatures above 850° F. Under the low temperature conditions requisite to the present isocracking operation, on the other hand, nitrogen compounds present in the feed drastically reduce the effectiveness of the catalyst.

As previously indicated, the catalyst employed in the isocracking process is a multi-functional catalyst composition comprising nickel sulfide and/or cobalt sulfide as a hydrogenating component, disposed on a solid active acidic support. The catalyst support may comprise any one or more of such acidic materials as the conventional cracking catalysts containing composites of silica-alumina, silica-magnesia, silica-alumina-zirconia, acid treated clays, and the like. In addition, satisfactory results have been obtained with synthetic metal aluminum silicates (such as the synthetic chabazites commonly referred to as "molecular sieves") that impart the necessary cracking activity to the catalyst. Preferred cracking catalysts employed as supports are synthetically prepared silica-aluminas having silica contents in the range of from about 40 to 99 percent. The total amount of nickel sulfide and/or cobalt sulfide component disposed on the support may be varied within relatively wide limits of from about 0.1 to 35 percent (as the metal), based on the weight of the entire catalyst composition.

The catalysts preferred for use in the process of the invention are characterized by high activity, that is, they are capable of converting substantial proportions of the hydrocarbon feeds, above described, to lower boiling products under mild operating conditions. For example, the preferred catalysts are characterized by the ability to convert 50 volume percent of a hydrofined typical light catalytic cycle stock containing less than 10 volume percent of components boiling below 400° F., in a true boiling point distillation, and having the following inspections:

ASTM distillation D–158:
    10% point, °F _____ 425 to 450
    90% point, °F _____ 500 to 560
    Aniline point, °F _____ 85 to 120
    Basic nitrogen content, p.p.m _____ Below 5 to products boiling below about 400° F. at temperatures below 650° F., a hydrogen partial pressure of 1100 p.s.i.g., and a liquid hourly space velocity of 2.0, hydrogen being introduced into the reaction zone at the rate of 6500 standard cubic feet of hydrogen per barrel of feed. Catalysts exhibiting this degree of activity can be prepared in various ways. For example, catalysts of such activity can be prepared by impregnating a synthetic silica-alumina cracking catalyst support with sufficient nickel nitrate to give the impregnated silica-alumina a nickel content in the range of about 6 to 15% by weight. The nitrate is decomposed and the impregnated support is then sulfided by contacting it with hydrogen sulfide or with hydrogen and a low molecular weight mercaptan or organic sulfide at temperatures below about 750° F., and preferably below 700° F. Catalysts exhibiting the preferred activity can also be prepared by impregnating a silica-alumina support with a nickel compound, drying the impregnated support, and then heating it to a temperature in the range 1200° to 1600° F. for a period of about .25 to 48 hours. After the treatment, the catalyst is sulfided in the manner indicated above at temperatures below 750° F. The preferred activity level can also be reached by treating cobalt sulfide or nickel sulfide supported on silica-alumina with hydrogen fluoride to impart of the order of at least 0.5 weight percent of fluoride in the catalyst.

In the operation of the isocracking process, the feed stock can be introduced to the reaction zone as either a liquid, vapor, or mixed liquid-vapor phase, depending upon the temperature, pressure, proportions of hydrogen and boiling range of the charge stocks utilized. The feed stock is introduced in admixture with at least 1500 s.c.f. of hydrogen per barrel of total feed (including both fresh as well as recycle feed). At least 500, and normally from about 1000 to 2000, s.c.f. of hydrogen are consumed in the isocracking reaction zone per barrel of total feed converted to synthetic products, i.e., that boiling below the initial boiling point of the fresh feed. The hydrogen stream admixed with incoming feed is conventionally made up of recycle gas recovered from the effluent from the isocracking zone, together with fresh make-up hydrogen. The hydrogen content of the recycle gas stream in practice generally ranges upwardly of 70 volume percent.

The pressures employed in the isocracking zone are in excess of a hydrogen partial pressure of at least 350 p.s.i.g., and may range upwardly to as high as 2000 p.s.i.g., with a preferred range being a hydrogen partial pressure of from about 500 to 1500 p.s.i.g. Hydrogen partial pressures below about 350 p.s.i.g. result in decreased conversions per pass, as well as shorter on-stream periods by reason of an accelerated tendency to induce dehydrogenation of naphthenes to aromatics, a reaction accompanied by carbonaceous fouling of the catalyst. On the other hand, hydrogen partial pressures above about 1800 p.s.i.g. normally tend to cause unnecessary hydrogenation of aromatics contained in the feed.

Generally, the isocracking zone feed may be introduced into the reaction zone at a liquid hourly space velocity (LHSV) of from about 0.2 to 5 volumes of hydrocarbon (calculated as liquid) per superficial volume of catalyst, with a preferred rate being from about 0.5 to 3 LHSV.

One of the most advantageous aspects of the subject isocracking process is that the reaction temperature is maintained below 700° F. The importance of such low temperature operations is reflected in long on-stream periods extending over many hundreds of hours, the production of extremely low yields of light gases and of a $C_4$ to 180° F. product having iso to normal paraffin ratios well in excess of thermodynamic equilibrium ratios. In the preferred practice of this invention, the temperature at which the reaction is initiated when placing a fresh charge of catalyst on-stream should be as low as possible (commensurate with the maintenance of adequate per-pass conversion levels), since the lower the starting temperature, the longer will be the duration of the said on-stream period. For any given conversion, the permissible starting temperature is a function of catalyst activity since the more active catalysts (i.e., those capable of effecting a relatively high per-pass conversion under given operating conditions such as the activated catalysts discussed hereinbefore) permit the unit to be placed on-stream at lower starting temperatures than would otherwise be the case. In any event, the conversion reaction should be conducted at temperatures below about 700° F., with preferred initiating temperatures being in the range of from about 400° to 650° F. or even lower.

The process of the present invention is conducted under the specified conditions of temperature, pressure and space rate such that at least 20 volume percent of the initial feed to the isocracking zone is converted per pass to products boiling below the initial boiling point of said feed. Preferably, the reaction conditions are adjusted such that the per-pass conversion to synthetic product is in the range of from about 40 to 80 volume percent. Additionally, it is preferred to operate the isocracking process by periodically increasing the reaction temperature so as to maintain the selected per-pass conversion at relatively constant levels.

Another valuable result of the low-temperature isocracking reaction, with its use of specific catalysts, is the presence of isoparaffins in the product in amounts substantially above the amounts which would be present in equilibrium mixtures of the isomers at reaction temperatures. This is particularly significant in the $C_5+$ paraffin range where the normal paraffins possess poor octane ratings. Such abnormal production of isoparaffins is in contrast to conventional hydrocracking, which produces synthetic paraffins substantially at the thermodynamic iso-normal equilibrium ratio. The high production of comparatively low-boiling, high-octane isoparaffins in the reaction zone is believed to be due to the "paring" reaction.

Basis for this belief is provided by the fact that when hexamethylbenzene and hydrogen were passed over a catalyst consisting of nickel sulfide disposed on a silica-alumina support at a temperature of 600° F. and a hydrogen partial pressure in excess of 350 p.s.i.g., the reaction products were found to contain large amounts of lower boiling aromatics (pentamethylbenzenes, tetramethylbenzenes, trimethylbenzenes, etc.) with about 95 percent of the original ring structures remaining. Only a small portion of the methyl groups removed from the hexamethylbenzene appeared as methane. A comparison of the methyl groups lost (pared) from the ring compounds with those appearing in the light gaseous products showed that there was insufficient product lighter than butanes to account for the missing methyl groups. Further, because of the very high ring yields, it was impossible to account for the high yields of light isoparaffins by the cracking of the aromatic nuclei.

EXAMPLE I

As an illustration of the effect of low temperature operation on the iso-normal ratio in the synthetic paraffin products, the following data are presented. In this exemplification, a hydrofined naphtha boiling in the range 370° to 455° F. and containing less than 2 p.p.m. total nitrogen was processed under the following conditions:

Pressure _____ p.s.i.g__ 1200
$H_2$ partial pressure _____ p.s.i.g__ 1100
$H_2$ consumption _____ s.c.f./bbl__ 1200
LHSV _____ 1.67
Gas recycle _____ s.c.f./bbl__ 6500
Conversion per pass _____ vol. percent__ 60
Operation _____ Recycle The catalyst employed in the reaction zone was prepared by impregnating 120 cc. synthetic silica (90 weight percent) alumina (about 10 weight percent) 8–14 mesh cracking catalyst (tempered for 24 hours at 1400° F. in dry air) with a solution of nickel nitrate solution. The nickel on the catalyst amounted to 3.5 weight percent of its total weight. The catalyst was then dried 10 hours at 250° F. and 10 more hours at 1000° F. The nickel oxide in the catalyst was then reduced by (1) contact the catalyst for ½ hour at 580° F. and atmospheric pressure with 6 cubic feet per hour of hydrogen, and (2) contacting the catalyst for 1 hour at 580° F. and 1200 p.s.i.g. with about 0.11 cubic feet per hour of hydrogen. The nickel was then substantially sulfided by contacting the catalyst for 3 hours at 580° F. and 1200 p.s.i.g. with 0.33 s.c.f./hour of 10 percent hydrogen sulfide in hydrogen.

The following results were obtained at the indicated temperatures:

| Temperature, °F | 650 | 750 | 800 |
|---|---|---|---|
| $C_6$ paraffin iso/normal ratio | 28 | 18 | 15 |
| Thermodynamic equilibrium | 2.6 | 2.4 | 2.3 |

It might be noted that all of the equilibrium iso/normal paraffin ratios shown herein are those of single branch iso species to normal paraffins since it has been found that essentially no multi-branch compounds are produced in the isocracking reaction. Thus, in reporting $C_6$ iso/normal equilibrium ratios, the double branch compound 2,2-dimethylbutane is excluded.

EXAMPLE II

The selectivity of the isocracking catalysts comprising a nickel and/or cobalt sulfide hydrogenating component disposed on the acid support, in the production of a high iso to normal paraffin synthetic product can be shown by a comparison of a metallic nickel with a nickel sulfide catalyst. Thus, two samples of catalyst, each composed of 11.1 weight percent nickel oxide disposed on a synthetic silica-alumina cracking catalyst support (about 90 weight percent silica and about 10 weight percent alumina), were subjected to a treatment of 12 percent HF. The catalysts were reduced in hydrogen to essentially convert the NiO to the metallic form. One of the samples was then contacted with a hydrogen sulfide-hydrogen gaseous mixture to substantially completely convert the nickel to the sulfide. The two samples were then separately employed in an isocracking reaction wherein n-decane and hydrogen were contacted with the catalyst at a temperature of 450° F. and a pressure of 1185 p.s.i.g. (hydrogen partial pressure of greater than 900 p.s.i.g.). The products were analyzed and the ratio of synthetic iso to normal $C_5$ and $C_6$ paraffins determined. The comparisons of these ratios, along with the thermodynamic equilibrium ratios at the same temperature and pressure, are given in Table I below.

Table I

|  | Equilibrium | Metallic Nickel | Sulfided Nickel |
|---|---|---|---|
| $C_5$ | 3.4 | 1.6 | 10.5 |
| $C_6$ | 3.1 | 3.0 | 10.8 |

From the table, it can be seen that the metallic nickel catalyst produced $C_5$–$C_6$ paraffins having iso/normal ratios below thermodynamic equilibrium whereas with the nickel sulfide catalyst the ratios were considerably in excess of the equilibrium ratios.

EXAMPLE III

The aforementioned selectivity for producing isoparaffins is also emphasized by comparing a cobalt sulfide catalyst with catalysts containing metallic cobalt, metallic platinum and platinum sulfide. The comparison is made by separately reacting n-decane and hydrogen over catalysts having essentially the same cracking supports (synthetic silica-alumina as in Example II) at a temperature of 550° F. and a pressure of 1185 p.s.i.g. The determined $C_5$ and $C_6$ iso-normal paraffin ratios of the products produced in the presence of these catalysts and the equilibrium ratios are given in Table II below.

Table II

|  | Equilibrium | Platinum | Platinum Sulfide | Cobalt | Cobalt Sulfide |
|---|---|---|---|---|---|
| $C_5$ | 2.9 | .09 | 2.0 | .4 | 8.2 |
| $C_6$ | 2.7 | .07 | 2.5 | .5 | 8.5 |

Again, it can be seen from the table that the cobalt sulfide catalyst produces $C_5$ and $C_6$ iso-to-normal paraffin ratios above equilibrium.

The employment of low temperatures in the isocracking zone also makes possible higher yields of synthetic product. At operating temperatures below about 700° F., the synthetic liquid yields are consistently high, whereas at higher temperatures the liquid yields fall off and the production of undesirable light gases increases to an unduly high level. Thus, in Example I above, the volume percent yield of the synthetic $C_5$+ gasoline fraction at 650° F. was in excess of 94 percent, whereas the yield of this fraction when operating at 800° F. was approximately 86.5 percent. Additionally, it might be pointed out that the production of undesirable methane increased 15-fold when the reaction temperature is raised from 700° to 800° F. Further advantages are reflected in the increase in the length of the effective on-stream life of the catalyst which is obtained when operating at temperatures below 700° F., particularly when the lowest initial temperatures commensurate with the desired per-pass conversions are employed.

The following example shows the long on-stream periods that can be attained without catalyst regeneration by the isocracking reaction.

EXAMPLE IV

An activated isocracking catalyst was prepared by impregnating 126 cubic centimeters of silica-alumina (about 90 percent silica and 10 percent alumina) cracking catalyst fines with a solution of nickel nitrate to dispose 6 weight percent nickel on the cracking catalyst support. The catalyst was dried in a kiln to 600° F. and then thermactivated by contact for 2.2 hours with hot air (15 s.c.f./min.) at an average temperature of 1427° F. The nickel oxide was then reduced by contacting the catalyst with once-through hydrogen (1.6 cubic feet/hour) at atmospheric pressure while heating from 60° to 570° F. at 100° F. per hour, and thereafter contacting the catalyst with hydrogen (1.6 s.c.f./hour) at 1500 p.s.i.g. and 570° F. for one hour. Sulfiding of the nickel component was performed by contacting the catalyst with a solution (66 cc./hour) of 2.6 theories of 10 weight percent isopropyl mercaptan in hexane for 3.5 hours at 1500 p.s.i.g. and 570° F. Hydrogen (2.22 s.c.f./hour) was simultaneously passed over the catalyst at a rate so as to give 2 percent $H_2S$ in the gas. The catalyst was then placed in a fixed catalyst bed reactor and employed in the sequence of runs described below without regeneration during the entire sequence.

Seven different feed stocks were subjected to the isocracking reaction of the present invention. Brief inspections on these feed stocks are shown in Table III below. Feed A was a hydrofined mixture of straight-run and catalytically cracked heavy naphtha. The remaining feeds were hydrofined catalytically cracked light cycle oils.

*Table III*

| Feed No. | Boiling Range, °F. | Gravity, °API | Aniline Point, °F. | Total Nitrogen, ppm. |
|---|---|---|---|---|
| A | 369–447 | 40.2 | 114.0 | 0.2 |
| B | 398–566 | 29.5 | 88.0 | 0.3 |
| C | 398–616 | 31.0 | 118.0 | 1.0 |
| D | 365–596 | 29.1 | 87.5 | 0.5 |
| E | 404–569 | 30.9 | 107.0 | 0.2 |
| F | 384–574 | 29.9 | 98.0 | <1.0 |
| G | 379–637 | 30.8 | 121.0 | 0.1 |

In all of the runs, extinction recycle operations were employed. Thus, in the first 238 hours of operation, all products boiling above 360° F. were recycled to the isocracking reactor. From 238 to 852 hours all products boiling above about 350° F. were recycled. Thereafter, all products boiling above 400° F. were recycled. For the first 570 hours, a pressure of 1500 p.s.i.g. (hydrogen partial pressure about 1150 p.s.i.g.) and a hydrogen-containing gas rate of 8000 s.c.f. per barrel of feed was employed. From 570 to 852 hours, a pressure of 1300 p.s.i.g. (hydrogen partial pressure about 950 p.s.i.a.) and a gas rate of 7000 s.c.f. per barrel of feed was used. Thereafter, a hydrogen partial pressure of about 1100 p.s.i.a. was employed. An average conversion of 60 volume percent to products boiling below the recycle cut point was maintained over the entire 3410-hour run, with the conversion, except for very minor periods, varying between about 55 and 65 volume percent. Feed introduction to the reactor, and the temperatures used, were in the sequence described below.

*Feed A, 0–852 hours.*—Feed A was contacted with the catalyst at an initial average reactor temperature of 570° F. at an LHSV of 1.35. At the end of 852 hours the average temperature had been raised to 597° F. to maintain constant conversion. Of the synthetic product, 2.26 weight percent were $C_1$–$C_3$ gases, and 8.0 percent were butanes having an iso to normal ratio of 2.08. Thermodynamic equilibrium at 590° F. for butanes is 0.88.

*Feed B, 852–1475 hours.*—Feed A was discontinued and feed B was fed into the reactor. After about 20 hours of adjustment, the feed LHSV was 0.8 and the initial reactor temperature was 580° F. After 623 hours on-stream, feed B was discontinued at an average reactor temperature of 604° F. The synthetic product contained 3.12 weight percent $C_1$–$C_3$ gases and 9.92 percent butanes having an iso/normal ratio of 2.14. The equilibrium ratio at the average temperature of 590° F. is 0.88.

*Feed C, 1475–1748 hours.*—Feed C, at a space rate of 0.8 LHSV, was contacted with the catalyst at an initial reactor temperature of 600° F. and maintained on-stream for 273 hours until discontinued at a reactor temperature of 620° F. The synthetic product contained 3.27 weight percent $C_1$–$C_3$ gases and 11.39 percent butanes having an iso to normal ratio of 1.81. The equilibrium ratio at 610° F. is 0.85.

*Feed D, 1748–2306 hours.*—Feed D, at a space rate of 0.8 LHSV, was contacted with the catalyst at an initial reactor temperature of 620° F. and kept on-stream for 558 hours until discontinued at a reactor temperature of 638° F. This synthetic product contained 3.51 weight percent $C_1$–$C_3$ gases and 11.13 percent butanes. The latter were present in an iso to normal ratio of 1.42. The equilibrium ratio at 630° F. is 0.83.

*Feed E, 2306–2668 hours.*—Feed E was charged to the reactor at 0.8 LHSV at an initial reactor temperature of 630° F. After 362 hours, feed E was discontinued at a temperature of 648° F. The product contained 3.32 weight percent $C_1$–$C_3$ gases and 11.33 percent butanes with an iso to normal ratio of 1.73. Equilibrium at 640° F. is 0.82.

*Feed B, 2668–2810 hours.*—Feed B was again introduced into the reactor at an LHSV of 0.8. The initial reactor temperature was 648° F. and the final temperature on this feed was 655° F. after an on-stream period of 142 hours. The synthetic product contained 3.70 weight percent $C_1$–$C_3$ gases and 10.84 percent butanes with an iso to normal ratio of 1.59. Equilibrium at 650° F. is 0.81.

*Feed F, 2810–3058 hours.*—Feed F was then charged (0.8 LHSV) for 248 hours, the period encompassing a reactor temperature increase from 650° to 656° F. The product contained 3.49 weight percent $C_1$–$C_3$ gases and 10.67 percent butanes with an iso to normal ratio of 1.62. Equilibrium at 653° F. is 0.81.

*Feed G, 3058–3410 hours.*—Feed G was passed into the reactor at an LHSV of 0.8 and contacted for 352 hours at reactor temperatures increasing from 650° to 667° F. The synthetic product contained 3.97 weight percent $C_1$–$C_3$ compounds and 11.52 percent butanes having an iso to normal ratio of 1.72. Equilibrium at 660° F. is 0.80.

Based upon a limiting reaction temperature of about 700° F., it can be seen that, by employing feeds similar to those utilized in the described operation, that the on-stream period could be extended for over 1000 hours more prior to catalyst regeneration or replacement. The advantages of such long term reaction periods are apparent. It might be noted that, in all conversions of feeds A to G inclusive, the reactions produced less than 4 weight percent (based on the total synthetic isocracking product) of $C_3$ and lighter gases, while giving high iso to normal ratios in the butanes. Hydrogen consumption in all of the runs exceeded 500 s.c.f. of hydrogen per barrel of feed converted to product boiling below 350° F.

The following example shows that the isocracking process will attain appreciable conversions at temperatures as low as 350° F.

EXAMPLE V

Normal decane and over 500 s.c.f. of hydrogen per barrel of paraffin feed were contacted with an isocracking catalyst containing 12 weight percent nickel (as the sulfide) and about 5 weight percent fluoride on a silica-alumina cracking catalyst (about 90 percent silica and 10 percent alumina) at an LHSV of 2, temperature of 350° F., a total pressure of 1185 p.s.i.g., and a hydrogen partial pressure above 900 p.s.i.g. It was found that about 20 percent of the normal decane was converted to synthetic product. Under these conditions, comparable conversions of hydrocarbon mixtures boiling in the range 320° to 850° F. can be realized. Higher conversions can, of course, be attained by reducing the space velocity below the 2 LHSV experimentally employed.

It might be noted that all of the catalysts employed in the runs exemplified herein were sulfided prior to introduction of feed. However, it must be understood that sulfiding of the nickel and/or cobalt hydrogenating component can be performed in situ by contacting a nickel and/or cobalt catalyst in the reaction zone with sulfur-containing compounds such, for example, as might be naturally present in the feed or added thereto, although these methods are not necessarily equivalent.

The process of the present invention is well adapted to be carried out using any type feed-catalyst contacting method. Thus, such methods as fixed-bed, moving-bed, slurry, or fluid catalyst systems can be employed by procedures well known in the art. The preferred method is that employing at least one fixed catalyst bed. Since reaction on-stream periods are so long, generally it is more economic to merely replace the deactivated catalyst with fresh catalyst. However, catalyst regeneration can be performed, for example, by contacting the deactivated catalyst with an oxygen-containing gas at temperatures of from about 700° to 1000° F., reducing the resulting nickel and/or cobalt oxide to the metal and then sulfiding (in situ if desired) by contacting the catalyst at temperatures below 750° F. with hydrogen and $H_2S$ or a gaseous compound capable of generating $H_2S$. In some cases, it may be desirable to eliminate the reduction step by sulfiding the oxide directly.

PREFERRED OPERATION OF THE ISOCRACKING PROCESS FOR THE PRODUCTION OF REFORMER FEEDS

It has been found that the product fraction, boiling in the range of from about 100° to about 450° F., recovered from the isocracking of feed stocks boiling in the range of from about 320° to about 850° F. will, upon catalytic reforming, produce a reformed gasoline blending stock having an octane number-yield relationship more attractive than any reformed gasoline derived from a reformer feed boiling in the same range, be it a straight-run, cracked, or hydrogenated stock. This enhanced result is obtained even when the isocracking product has the same proportions of molecular types as that of the conventional reformer feed. That is, when a reformer feed prepared by the isocracking process has the same volume percentage of paraffins, naphthenes, and aromatics as the conventional feed stock, it will, upon reforming, produce a product having a higher F–1 octane number at a given yield or a higher yield of product of a given F–1 octane number than other feed stocks. Although the actual mechanism is not completely understood, the isocracking reaction, incorporating the reactions of paring, disproportionation and selective cracking, apparently produces and/or redistributes the paraffins, naphthenes and aromatics within the 100° to 450° F. boiling range fraction in a manner much more favorable for subsequent reforming than is the case with other reformer feed stocks.

It will be noted that the higher boiling portion of the product reformer feed (boiling generally in the range of from about 100° to 450° F.) can overlap the lowest boiling portion of the isocracking feed (boiling within the range of from about 320° to about 850° F.). That portion of the isocracker product boiling below the initial point of the feed to the unit is a synthetic product, i.e., a product synthesized in the isocracking reaction. But, even in the situation where there is an overlap as described, benefits from subsequent reforming can be attained so long as the reformer feed stock contains appreciable quantities of synthetic isocracking product. In the case where cycle oils, gas oils, and the like having initial boiling points above about 450° F. are employed as the isocracker feed, the product from the isocracking zone which comprises the reformer charge will be composed entirely of a synthetic product. In the present process, it is preferred that the product from the isocracking zone that is employed as a reformer feed consist predominantly of synthetic product and include substantial portions of the synthetic product boiling within the range of from about 180° to 360° F.

The term "reforming" is well known in the petroleum industry and refers to the treatment of fractions boiling generally within the range of about 100° to 450° F. to improve the antiknock characteristics of such fractions for use in gasolines. Since aromatic hydrocarbons generally have high octane numbers, the normal objective of a reforming operation is dehydrogenation of naphthenic hydrocarbons and dehydrocyclization of paraffins to produce aromatics. The reforming process involves a net production of hydrogen and is conducted in the presence of a reforming catalyst (such as platinum on an alumina support) under an elevated pressure and at a temperatures well above 750° F. Operating conditions for reforming are well known and will generally fall within the temperature range of about 750° to 1050° F., and a pressure range of about 100 to 1000 p.s.i.g. Hydrogen to feed ratios (mol) of at least 3 are generally employed. Contact of the feed with the reforming catalyst is generally at an LHSV of from about 0.2 to 5.0.

The following examples clearly show the octane-yield advantages that can be realized by reforming portions of the product of the isocracking reaction.

EXAMPLE VI

A hydrofined mixture of catalytically cracked and straight-run naphthas was subjected to an isocracking reaction according to the process of the present invention. This feed mixture had the following characteristics:

| | |
|---|---|
| Gravity, °API | 36.7 |
| Aniline point, °F. | 88.5 |
| Total N content, p.p.m. | 1.0 |
| Composition, vol. percent: | |
| Paraffins | 28.4 |
| Naphthenes | 28.6 |
| Aromatics | 43.0 |
| ASTM distillation D86, °F.: | |
| Start | 370 |
| 50% | 383 |
| End point | 455 |

The above-described feed was contacted with an isocracking catalyst (about 3 weight percent nickel, sulfided, disposed on an active acid cracking catalyst of about 90 percent silica and 10 percent alumina). The reaction was conducted at 60 percent per-pass conversion at temperatures below 700° F. with extinction recycle of the 360° F.+ product. The reaction conditions and results are shown in Table IV below:

Table IV

| | |
|---|---|
| Operating conditions: | |
| Temperature, °F. (avg.) | 655 |
| LHSV, v./v./hr. | 0.8 |
| Pressure, p.s.i.g. | 1200 |
| Gas recycle, s.c.f./bbl | 6750 |
| $H_2$ consumption, s.c.f./bbl | 1210 |
| Yields: | |
| $C_4+$, vol. percent | 112.4 |
| $C_5+$, vol. percent | 93.9 |

| Product Inspections | $C_5-$ 180° F. | 180°– 360° F. |
|---|---|---|
| Boiling Range | | |
| Fraction of $C_5+$, Vol. Percent | 29.5 | 70.5 |
| Gravity, °API | 81.7 | 46.1 |
| Aniline Point, °F. | | 69.5 |
| Octane No.: | | |
| F–1 Clear | 87.3 | 83.2 |
| F–1 +3 ml./gal. TEL | 100.0 | 94.6 |
| Composition (MS), Vol. Percent: | | |
| Paraffins | 78 | 23.6 |
| Naphthenes | 19 | 40.8 |
| Aromatics | 3 | 35.6 |
| ASTM Distillation D86, °F.: | | |
| 5 Percent | 105 | 234 |
| 50 Percent | 128 | 275 |
| 95 Percent | 159 | 337 |

Separate samples of the 180°–360° F. isocracking product (along with added hydrogen) were then subjected to reforming operations of varying severity over a reforming catalyst containing 0.75 weight percent platinum on alumina, the latter including 0.35 weight percent Cl and 0.35 weight percent F. The reforming conditions and results are shown in Table V below:

*Table V*

| Run No. | D11 | D12 | D13 |
|---|---|---|---|
| Operating Conditions: | | | |
| Temperature, °F | 884 | 921 | 951 |
| LHSV, v./v./hr | 2 | 2 | 2 |
| Pressure, p.s.i.g | 500 | 500 | 500 |
| Gas Recycle, s.c.f./bbl | 9,465 | 9,492 | 9,455 |
| Yields: | | | |
| $H_2$, s.c.f./bbl | 485 | 585 | 555 |
| $C_4+$, Vol. Percent | 95.3 | 92.8 | 90.2 |
| $C_5+$, Vol. Percent | 94.3 | 91.4 | 87.4 |
| Product Inspections: | | | |
| Octane No.— | | | |
| F–1 Clear | 96.8 | 100.0 | 102.7 |
| F–1 +3 ml./gal. TEL | 101.7 | 103.7 | 10.60 |
| Composition— | | | |
| Paraffins | 26.0 | 23.9 | 20.1 |
| Naphthenes | 10.1 | 5.7 | 4.1 |
| Aromatics | 63.9 | 70.4 | 75.8 |
| ASTM Distillation D86, °F.: | | | |
| 5 Percent | 225 | 216 | 203 |
| 50 Percent | 276 | 279 | 281 |
| 95 Percent | 350 | 349 | 353 |

When the $C_5$–180° F. isocracking zone product fraction was blended with the above-noted $C_5+$ reformate, the $C_5+$ gasoline produced by the combination process had the following octane No.-yield relationship:

| $C_5+$ Yield, Vol. Percent | 95 | 93 | 90 |
|---|---|---|---|
| Octane No.: | | | |
| F–1 Clear | 95 | 97 | 98 |
| F–1 +3 ml./gal. TEL | 102 | 103 | 104 |

EXAMPLE VII

This example is inserted for comparative purposes only, inasmuch as the operations described do not follow the process of the subject process.

From a mass of data gathered from the reforming of a tremendous number of feed stocks in many catalytic reforming units, a representative reformer feed stock (X) was selected that was a mixture of straight-run and catalytically cracked naphtha and had substantially the same gravity, aniline point, paraffin-naphthene-aromatic compound distribution and boiling point as the 180°–360° F. isocracking zone product fraction shown in Example VI. Feed stock X was reformed under the same conditions disclosed in Example VI. A comparison of the resulting octane number-yield relationship of this feed with the reformed product of Example VI is shown below:

| $C_5+$ Yield, Vol. percent | 87.4 | 91.4 | 94.3 |
|---|---|---|---|
| Octane No., F–1 Clear: | | | |
| Reformed Feed X | 98.8 | 96.7 | 93.9 |
| Reformed Isocracking Zone Product | 102.7 | 100.0 | 96.8 |

From the above table, it can be seen that the reformed 180°–360° F. product from the isocracking zone gives considerably higher octane numbers than a conventional feed stock having essentially the same boiling range, gravity, aniline point, and paraffin-naphthene-aromatic distribution.

EXAMPLE VIII

A feed stock, boiling in the range of from about 180° to 450° F. and containing less than 1 p.p.m. of total nitrogen, and composed of a hydrofined mixture of straight-run and cracked naphthas was contacted at an LHSV of 2.8 in an isocracking zone at an average temperature of about 650° F. and a hydrogen partial pressure of about 1000 p.s.i.g. with a catalyst comprising 3.0 weight percent nickel (in the form of the sulfide) disposed on a silica (about 90%) and alumina (about 10%) cracking catalyst support. The hydrogen-rich gas recycle was about 1800 s.c.f./bbl. and the hydrogen consumption about 600 s.c.f./bbl. The conversion was maintained at a constant 60% per-pass with respect to the 360° F.+ portion of the feed under once-through operations. The $C_5+$ product from the isocracking zone was recovered and its inspections are presented in Table VI below. For comparative purposes, inspections on a hydrofined straight-run cracked naphtha reformer feed stock (called feed Y), boiling in substantially the same range, are also shown.

*Table VI*

| | Isocracked $C_5+$ Product | Feed Y |
|---|---|---|
| Gravity, °API | 51.6 | 49.7 |
| Aniline Point, °F | 108 | 109.0 |
| Octane No. F–1+3 ml./gal. TEL | 82.3 | 77.4 |
| Composition, Vol. percent: | | |
| Paraffins | 39.3 | 32 |
| Naphthenes | 41.2 | 47 |
| Aromatics | 19.5 | 21 |

From the above, it can be seen that the two hydrocarbon fractions had essentially the same gravity, aniline point, paraffin+naphthene/aromatic distribution, and boiling range.

These two fractions were each contacted with a reforming catalyst containing 0.75 weight percent platinum, 0.35 weight percent chlorine, and 0.35 weight percent fluorine disposed on an alumina support. The reforming conditions and results obtained on these two reformer feeds are shown in Table VII below.

*Table VII*

| | Isocracked $C_5+$ Product | Feed Y |
|---|---|---|
| Reforming Conditions: | | |
| Avg. Catalyst Temp., °F | 919 | 875 |
| LHSV, v./v./hr | 2 | 2 |
| Pressure, p.s.i.g | 500 | 500 |
| Gas Recycle (s.c.f./bbl.) | 9,401 | 7,000 |
| Yields: | | |
| $C_4+$, Vol. percent | 94.4 | 93.5 |
| $C_5+$, Vol. percent | 90.4 | 90.7 |
| Product | $C_5+$ | $C_5+$ |
| Gravity, °API | 46.6 | 44.8 |
| Aniline Point, °F | 102 | |
| Octane No.: | | |
| F–1 Clear | 94.6 | 89.1 |
| F–1+3 ml./gal. TEL | 100.2 | 98.4 |
| Composition: | | |
| Paraffins | 39.0 | 41 |
| Naphthenes | 8.3 | 7 |
| Aromatics | 52.8 | 52 |

From the above table, it can be seen that, when a conventional feed stock (feed Y) is compared with an isocracked product having almost the same boiling range, gravity, aniline point, and paraffin+naphthene/aromatic distribution at the same reforming yield, the reformer feed produced by the process of the present invention makes a reformate gasoline of considerably higher octane.

Since the isocracking reaction produces a $C_5+$ to 180° F. synthetic product having an extremely high iso-normal paraffin ratio, the refiner can separate this fraction from the isocracking zone effluent and employ it directly in his gasoline pool due to the high octane values imparted to this fraction by the isoparaffins. The refiner can then select a superior reformer feed, either all or in part, from the 180° to 450° F. isocracking zone product fraction. Particularly preferred operation for the isocracking-reforming sequence is for the operator to separate the isocracker effluent into a hydrogen-rich gaseous fraction for recycle to that zone, a light gas fraction, a high-octane gasoline fraction boiling in the range of from about 80° to 180° F., a reformer feed boiling above the gasoline cut up to about 360° F., with the higher boiling remainder being recycled to the isocracking reaction zone.

or split into various fractions for use as diesel, jet, or other fuels.

Although feed stocks boiling within the range of about 320° to 850° F. having total nitrogen contents below about 10 p.p.m. can be effectively employed in the process employing both the isocracking and reforming operations, the processing of feed stocks relatively low in aromatic content, e.g., containing less than about 30 volume percent aromatics, permit greater realization in octane improvement. Very large improvements are obtained from stocks which have been considered marginal as gasoline precursors. Thus, advantage can be taken of the high octane, high iso-to-normal paraffin ratio 80° to 180° F. isocracking product which can be passed directly into the gasoline pool. The 180° to 360° F. portion of the isocracking zone product, relatively low in aromatics, can then be reformed to produce high octane aromatics from the naphthenes and paraffins contained therein. By employing such a processing scheme, maximum benefits can be realized from both the isocracking and the reforming steps.

PREFERRED OPERATION OF THE ISOCRACKING PROCESS FOR THE DIRECT PRODUCTION OF HIGH ROAD OCTANE GASOLINE BLENDING STOCKS

Although the process of the present invention produces superior reforming feeds from initial feed stocks boiling over the entire range of from 320° to 850° F., irrespective of the aromatic hydrocarbon content of the stocks, and although, as noted above, the feed stocks containing less than about 30 volume percent aromatics are especially improved by conversion to reformer feeds, the present isocracking process will directly convert feed stocks containing in excess of 30 percent aromatics to high road octane gasolines that need not be reformed in order to meet the rather exacting octane requirements of current commercial gasolines.

In the following description of the direct conversion of 30 percent plus aromatic feeds, reference will be made to the octane number determinations designated as the Research (CFR–R) or F–1 octane rating and the older Motor Method (CFR–M) or F–2 octane rating. From these values may be determined the so-called Road octane rating which is a more accurate measure of the performance characteristics of the gasoline since it rates the fuel under actual highway conditions. It has been found that the Road octane rating can be accurately predicted from measured F–1 and F–2 ratings by use of the following equation:

Road octane rating=0.5(F–1+F–2 octane ratings)+4.0

According to this modification of the present invention, it has been found possible to utilize the distinctive features of the isocracking process for the production of a premium $C_5+$ gasoline product fraction boiling below about 330° F. which is characterized by its clean-burning properties and a leaded road octane rating of at least 95. (The term "leaded" as employed herein, designates those fuels which contain 3 ml. of tetraethyl lead (TEL) per gallon.)

The catalyst employed in this process scheme must meet all of the requirements hereinbefore described. Thus, it is comprised of nickel sulfide and/or cobalt sulfide disposed upon a solid active acid support. In addition, the catalyst is characterized by having a catalyst severity factor $(S_a)$ of from about 0.1 to 2.0, which factor indicates the tendency of the catalyst to decrease the aromatic content of the feed stock. This characteristic of the catalyst is determined by subjecting the catalyst to a standardized test wherein the reference feed stock is a trimethylbenzene, such as pseudocumene, or an equilibrium mixture of trimethylbenzenes which may be obtained from a catalytically reformed naphtha. When employing the latter trimethylbenzene concentrate, a narrow boiling fraction having a D86 distillation range from about 318° to 335° F. and a $C_9$ aromatic content of at least 95 volume percent should be used. The test involves contacting the reference feed stock with the test catalyst at a liquid hourly space velocity of 2.0 with 9000 s.c.f. of hydrogen per barrel of feed to convert from 40 to 60 volume percent of the reference feed to products boiling below 300° F. while maintaining a catalyst temperature at or below 650° F. and a pressure of 1200 p.s.i.g. This test operation is continued for a period of time (usually about 2 to 5 hours) sufficient to stabilize the system, and thereafter for a time sufficient to provide an adequate product sample. After flashing to atmospheric pressure the liquid product is then fractionated to determine the volume percent of product boiling below 300° F., relative to feed. This is taken as the synthetic product. Aromatic contents of the reference feed and said synthetic product are determined, as by chromatographic analysis (FIAM method), and the severity factor, $S_a$, is calculated from the expression:

$$S_a = \frac{A_f}{A_p} - 1$$

where $A_f$=volume percent aromatics in the feed, and $A_p$=volume percent aromatics in said product.

For operations in the subject isocracking process, the severity factor $(S_a)$ should have a value falling within the range of from about 0.1 to 2.0. An $S_a$ value substantially greater than 2.0 reflects an undesirable loss in aromatic content in the product, as well as a high hydrogen consumption. On the other hand, $S_a$ values below 0.1 normally reflect actual formation of aromatics and such reactions are undesirable for the purposes of this invention since they involve rapid catalyst deactivation due to deposition of coke, etc. Catalysts having $S_a$ values higher than the desired range can usually be brought into compliance by suitably adjusting the amount of the hydrogenating component present. All of the nickel sulfide and cobalt sulfide isocracking catalysts exemplified hereinbefore have $S_a$ values in the range 0.1 to 2.0.

In addition to the selection of the noted catalyst, operation of the isocracking process to directly produce a $C_5+$ gasoline boiling below about 330° F. having a leaded road octane rating of at least 95 requires that the initial feed stock boil in the range of from about 330° to 650° F. and contain at least 30 percent by volume of aromatic hydrocarbons. In addition, the feed should have a total nitrogen content of less than about 10 p.p.m. Suitable stocks meeting these requirements (after a hydrofining or other nitrogen-removal treatment, where required) can be of straight-run origin or be derived from thermal or catalytic cracking operations. Stocks derived from the latter operations include the so-called "cycle" oils which are generally highly aromatic, and, for this operation, are preferred. The cycle oils here contemplated are distilled from the cracker effluent and do not comprise the bottoms remaining after distilling off the more volatile (i.e., 650° F.–) portions of such effluent. Thus, they are not residual in character. In addition, suitable charging stocks may be obtained by blending component feeds to a selected balance of aromatic and nonaromatic hydrocarbon content.

The restriction of an end point of about 650° F. on the feed to an isocracking zone operating to produce a 95 road octane gasoline directly is based on the finding that relatively large concentrations of aromatic compounds boiling above about 650° F. tend to reduce the operational efficiency of the process due to their proclivity to foul the catalyst by deposition of carbonaceous deposits. This requires more frequent catalyst regeneration or replacement, which is reflected in shorter on-stream periods.

EXAMPLE IX

For the purpose of illustrating the effect of aromatic content on product quality, a series of runs were conducted under representative isocracking conditions wherein the process conditions of catalyst composition, temperature, pressure, space rate and hydrogen content and, in the case of runs (4) and (5) the specific conversions were 79 percent and 77.5 percent, respectively.

Table VIII

[Temperature—650° F.; Pressure—1200 p.s.i.g.; LHSV—2; H₂—6500 s.c.f./bbl.; Operation—once-through, no recycle; Catalyst—NiS on silica-alumina; Product—C₅ to 350° F. portion of reaction effluent.]

| | (1) Light Gas Oil | | (2) Hydrofined Stove Oil | | (3) Hydrofined Heavy Naphtha | | (4) Hydrofined Catalytic Cycle Oil | | (5) Hydrofined SO₂ Extract (St. Run Naphtha) | | (6) Hydrofined SO₂ Extract (Cycle Oil) | | (7) Reformate | | (8) Blending Aromatics | |
|---|---|---|---|---|---|---|---|---|---|---|---|---|---|---|---|---|
| | Feed | Product | Feed | Product | Feed | Product | Feed | Product | Feed | Product | Feed | Product | Feed | Product | Feed | Product |
| Basic N, p.p.m. | 4 | 0 | 3 | 0 | 0 | 0 | 1 | 0 | Trace | 0 | 1 | 0 | 0 | | 0 | |
| Aromatics, Vol. Percent | 15 | 9 | 24 | 15 | 42 | 32 | 49 | 27 | 60 | 36 | 69 | 36 | 93 | 67 | 98 | 68 |
| ASTM Distillation | D158 | D86 | D158 | D86 | D86 | D86 | D158 | D86 | D158 | D86 | D158 | D56 | D86 | D86 | D86 | D86 |
| Start | | 114 | 327 | 130 | 370 | 136 | 330 | 90 | 284 | 124 | 381 | 124 | 342 | 144 | 356 | 161 |
| 10% | 456 | 152 | 389 | 164 | 376 | 175 | 430 | 137 | 385 | 178 | 428 | 171 | 351 | 227 | 361 | 244 |
| 30% | | 182 | 417 | 198 | 379 | 212 | 460 | 194 | 398 | 216 | 454 | 215 | 358 | 270 | 364 | 281 |
| 50% | 517 | 220 | 441 | 231 | 389 | 244 | 478 | 236 | 418 | 248 | 471 | 250 | 364 | 289 | 366 | 296 |
| 70% | | 260 | 471 | 262 | 389 | 277 | 495 | 269 | 437 | 276 | 489 | 278 | 374 | 303 | 371 | 309 |
| 90% | 580 | 320 | 514 | 299 | 405 | 313 | 523 | 307 | 464 | 307 | 517 | 309 | 406 | 320 | 380 | 323 |
| E.P. | 614 | 361 | 592 | 354 | 455 | 346 | 570 | 328 | 500 | 328 | 571 | 328 | 486 | 339 | 414 | 348 |
| Octane Nos. (+3 cc. TEL): | | | | | | | | | | | | | | | | |
| F-1 | | 89.4 | | 92.4 | 80.7 | 98.0 | | 97.6 | | 99 | | 98.3 | | 102.5 | | 103.1 |
| Road | | 92.5 | | 94.3 | | 98.4 | | 98.8 | | 99.3 | | 98.8 | | 101.6 | | 102 | were maintained constant, and the only variation was in the charge stocks employed together with their variations in aromatic content. The charge stocks employed in this series of runs, the results of which are tabulated in the following Table VIII, are (1) a light virgin gas oil containing 15 percent aromatics obtained from a Venezuelan crude; (2) a stove oil, i.e., a straight-run naphtha of California origin, containing 24 percent aromatics; (3) a hydrofined feed containing 42 percent aromatics, which feed represents a mixture of catalytically-cracked and straight-run naphthas obtained from California crudes; (4) a catalytic cycle oil containing 49 percent aromatics obtained from the effluent of a catalytic cracker operating with California crudes; (5) an SO₂ extract containing 60 percent aromatics and representing the extract obtained by treating a straight-run naphtha of California origin; (6) another SO₂ extract containing 69 percent aromatics obtained by extraction from a light catalytic cycle oil of California origin from a fluid catalytic cracking unit; (7) a heavy reformate distillate containing 93 percent aromatics obtained from the effluent of a catalytic reformer employing a platinum catalyst and charging stocks from California crudes; and (8) a selected aromatic fraction containing 98 percent aromatics derived from the effluent of a catalytic reforming process. Other details of these charge stocks are given in the table, as are the various octane and other specifications of the products obtained by conversion in the isocracking reactor. In each case, the "product" represents the debutanized portion of the isocracker effluent boiling below about 330° F.

The particular catalyst employed in all of the runs comprised nickel sulfide (2.5 weight percent Ni) on a silica-alumina support (87 percent SiO₂) of high cracking activity. This catalyst was prepared by impregnating approximately 7.5 liters of a crushed SiO₂ (87 percent)—Al₂O₃ aggregate which had been dried in air for 24 hours at 400° F., with 2183.7 grams of $$Ni(NO_3)_2 \cdot 6H_2O$$

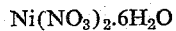

dissolved in water and made up to a total of 7760 milliliters. The impregnated base material was then held for 24 hours at 70° F. and calcined for 10 hours at 1000° F. The catalyst was then sulfided by treatment in an atmosphere of hydrogen containing 8 percent hydrogen sulfide at 1200 p.s.i.g. and 580° F. It was found that this catalyst had a severity factor of about 0.42.

In these comparative runs, the per-pass conversions to C₅+ products boiling below the initial boiling point of the feed were universally above 60 percent in the case of all feeds containing above 30 percent aromatics and, in the case of runs (4) and (5) the specific conversions were 79 percent and 77.5 percent, respectively.

Inspection of the foregoing table shows that leaded road octane values rise above 95 only as the aromatic content of the feed rises above 30 percent.

EXAMPLE X

An activated isocracking catalyst was prepared by impregnating a silica (about 90 percent) and alumina (about 10 percent) cracking catalyst with 12.5 weight percent nickel by contacting the support with nickel nitrate. The nickel was added to the support in two impregnations with calcining at about 1000° F. after each impregnation. The nickel was then reduced by (1) contact with flowing hydrogen for 30 minutes at 580° F. and 0 p.s.i.g. and (2) contact for 1 hour at 580° F. and 1200 p.s.i.g. with recycle hydrogen. The nickel was substantially sulfided by contacting the catalyst for 9 hours at 580° F. and 1200 p.s.i.g. with 2 percent H₂S in hydrogen at a rate of 1.67 s.c.f. per hour. Thereafter, fluoride was incorporated within the catalyst by contacting the catalyst for 4 hours at 580° F., 1200 p.s.i.g. at an LHSV of 3 with a 5 volume percent mixture of fluorobenzene in mixed hexanes in the presence of 12,000 s.c.f. of hydrogen per barrel of feed. The fluoriding step was conducted in situ, that is, it was done in the reactor employed in the conversion process described below. The catalyst had an S_a of about 1.0.

A hydrofined catalytic cycle oil (reduced by hydrofining to a total nitrogen content of about 2 p.p.m.) was employed as a feed stock to an isocracking zone containing the above-described catalyst. This feed had the following inspections:

| | |
|---|---|
| Gravity, ° API | 29.5 |
| Aniline point, ° F. | 85 |
| Aromatics, vol. percent | 55 |
| Paraffins and naphthenes, vol. percent | 45 |
| ASTM distillation D158: | |
| St./5%, ° F. | 378/426 |
| 10%/30%, ° F. | 436/456 |
| 50%, ° F. | 470 |
| 70%/90%, ° F. | 483/506 |
| 95%/E.P., ° F. | 518/549 |

Contact of this feed with the catalyst was made at an initial temperature of 510° F., a hydrogen partial pressure of about 1100 p.s.i.g., an LHSV of 1.52 in the presence of 12,000 s.c.f. of gas recycle (over 75 percent H₂) per barrel of feed. The temperature was then increased to about 550° F. and the space velocity increased to 3.0 to attain a once-through volume percent per-pass conversion of about 60 percent to products boiling below 360° F. (This temperature and space rate is equivalent to an initial temperature of about 510° F. at an LHSV of 1.0.) The temperature was gradually increased (up to 610° F.) to maintain the approximate 60 volume percent conversion. The hydrogen consumption was 1500 s.c.f. per barrel of products boiling below 360° F. Typical results from the operation are shown in Table IX below.

Table IX

Yields:
C₅+, Vol. Percent _____ 104.2
C₅ to 360° F., Vol. Percent _____ 62.9
360°+, Vol. Percent _____ 41.3
C₄, Vol. Percent _____ 9.26

| Product Inspection | C₅ to 360° Fraction | 360° + Fraction |
|---|---|---|
| Gravity, ° API | 53.4 | 35.0 |
| Aniline Point, ° F | 90.5 | 110 |
| Aromatics, Vol. Percent | 27 | 42 |
| Paraffins and Naphthenes, Vol. Percent | 73 | 58 |
| ASTM Distillation | D86 | D158 |
| St./5%, ° F | 118/150 | 410/427 |
| 10%/30%, ° F | 165/212 | 429/436 |
| 50%, ° F | 259 | 445 |
| 70%/90%, ° F | 298/338 | 457/485 |
| 95%/E.P., ° F | 351/375 | 498/535 |

The C₅ to 330° F. product fraction had a leaded road octane rating of 97.

The fractions of the isocracking zone effluent boiling above the end point of the gasoline fraction or fractions recovered from the unit can be recycled to substantial extinction by returning the same to said zone, or they may be diverted to other appropriate refinery uses, i.e., to jet fuels, certain gasolines, cutter stock, or the like.

This application is a continuation-in-part of my co-pending application Serial No. 746,831, filed July 7, 1958, now abandoned, which application, in turn, is a continuation-in-part of my application Serial No. 612,802, filed September 28, 1956, and now abandoned, which application, in turn, is a continuation-in-part of my application Serial No. 497,922, filed March 30, 1955, and now abandoned.

I claim:

1. A process for converting a hydrocarbon distillate feed having a total nitrogen content of less than 10 p.p.m. and boiling within a range of from about 320° to 850° F. to produce fractions boiling below the initial boiling point of said feed in a yield of at least 20% per pass, which comprises passing said feed, along with at least 1500 s.c.f. H₂ per barrel thereof, through an isocracking zone for contact therein, at hydrogen partial pressures of at least 350 p.s.i.g., at temperatures between 350° and about 700° F., and at liquid hourly space velocities above 0.2 v./v./hr., with a catalyst comprising a hydrogenating component selected from the group consisting of nickel sulfide and cobalt sulfide as disposed on an active siliceous cracking catalyst support, the process being characterized by operation during a substantial portion of the on-stream period not less than 100 hours at temperatures below 650° F., and by a hydrogen consumption of at least 500 s.c.f. per barrel of feed so converted.

2. The process of claim 1 wherein said hydrocarbon feed has a total nitrogen content of less than 2 p.p.m.

3. A process of producing a high octane gasoline which comprises contacting a hydrocarbon distillate feed boiling within the range of from about 320° to 850° F. and having a total nitrogen content of less than 10 p.p.m., along with at least 1500 s.c.f. of hydrogen per barrel of feed in an isocracking zone with a catalyst comprising at least one hydrogenating component selected from the group consisting of nickel and cobalt sulfides disposed on an active siliceous cracking catalyst support, said contacting in the isocracking zone being effected at hydrogen partial pressures of at least 350 p.s.i.g. and at temperatures below about 700° F., and resulting in a conversion of feed to products boiling below the initial boiling point of said feed of at least 20% per-pass, there being consumed in said isocracking zone at least 500 s.c.f. of hydrogen per barrel of feed so converted, recovering from said isocracking zone a fraction of which a substantial portion boils in the range of from about 180° to about 360° F., and contacting said fraction with reforming catalyst under reforming conditions to produce a high octane gasoline.

4. The process of claim 3 wherein the hydrocarbon feed has a total nitrogen content of less than 2 p.p.m.

5. A process for producing high octane gasoline from nitrogen-containing feed stocks which comprises contacting a nitrogen-containing hydrocarbon distillate feed boiling within the range of from about 320° to 850° F., along with added hydrogen, in a hydrofining zone under hydrofining conditions whereby the total nitrogen content of said feed is reduced to less than 10 p.p.m., passing the effluent from the hydrofining zone, along with at least 1500 s.c.f. of hydrogen per barrel of feed, into an isocracking zone and contacting said feed and hydrogen with a catalyst comprising a hydrogenating component selected from the group consisting of nickel and cobalt sulfides disposed on an active siliceous cracking catalyst support, said contacting in the isocracking zone being effected at hydrogen partial pressures of at least 350 p.s.i.g. and at temperatures in the range of from about 400° to 700° F., and resulting in a conversion of feed to products boiling below the initial boiling point of said feed of at least 20% per-pass, there being consumed in said isocracking zone at least 500 s.c.f. of hydrogen per barrel of feed so converted, recovering from said isocracking zone a hydrogen-rich stream, a light gas stream, a high-octane gasoline fraction boiling in the range of from about 80° to about 180° F. and characterized by an iso/normal C₅–C₆ paraffin ratio greater than the thermodynamic equilibrium ratio, a fraction boiling in the range of from about 180° to about 360° F. and a bottoms fraction, and passing said fraction boiling in the range of from about 180° to 360° F. into a reforming zone and contacting said fraction therein with a reforming catalyst under reforming conditions to produce a high octane number gasoline.

6. The process of claim 5 wherein at least a major portion of said bottoms fraction recovered from the isocracking zone is recycled thereto.

7. The process of claim 5 wherein at least a major portion of said hydrogen-rich stream recovered from the isocracking zone is recycled thereto.

8. The process of claim 5 wherein the hydrocarbon feed has a total nitrogen content of less than 2 p.p.m.

9. A hydrocarbon conversion process which comprises contacting a nitrogen-containing hydrocarbon distillate feed boiling within the range of from about 320° to 850° F., along with added hydrogen in a hydrofining zone under hydrofining conditions whereby the total nitrogen content of said feed is reduced to less than 10 p.p.m., contacting at least a portion of the effluent from the hydrofining zone, along with at least 1500 s.c.f. of hydrogen per barrel of said effluent, in an isocracking zone with a catalyst comprising a hydrogenating component selected from the group consisting of nickel sulfide and cobalt sulfide disposed on an active siliceous cracking catalyst support, said contacting in the isocracking zone being effected at hydrogen partial pressures of at least 350 p.s.i.g. and at temperatures between about 350° and 700° F., and resulting in a conversion of feed to products boiling below the initial boiling point of said feed of at least 20% per-pass, there being consumed in said isocracking zone at least 500 s.c.f. of hydrogen per barrel of hydrofining zone effluent so converted.

10. The process of claim 9 wherein the hydrofining zone effluent entering the isocracking zone has a total nitrogen content of less than 2 p.p.m.

11. A process for converting a nitrogen-containing petroleum feed stock to obtain a gasoline the C₅–330° F. fraction of which has a leaded road octane rating of at least 95, said process comprising reducing the nitrogen content of the feed stock by treating the same with hydrogen under elevated conditions of temperature and pressure in the presence of a hydrogenation catalyst without substantial cracking under the conditions employed, recovering from the treated stock so obtained a hydrocarbon fraction having an aromatic hydrocarbon content of at least 30% by volume, a basic nitrogen content of from 0 to 10 p.p.m. and boiling within a range of from about 330° F. to 650° F., and contacting said recovered fraction, along with at least 2000 s.c.f. hydrogen per barrel thereof, in an isocracking zone with a catalyst comprised of at least 1% by weight of at least one hydrogenating component selected from the group consisting of nickel sulfide and cobalt sulfide, said component being deposited on a siliceous active cracking catalyst support, said contacting in the isocracking zone being effected at pressures of from about 400 to 3000 p.s.i.g. and at average instantaneous catalyst temperatures of from about 450° F. to 700° F., there being consumed in said isocracking zone at least about 1000 s.c.f. hydrogen per barrel of feed converted therein to product boiling below the initial boiling point of said feed.

12. The process of claim 11 wherein the feed stock comprises a catalytic cycle oil.

13. The process of claim 11 wherein the feed stock comprises naphtha.

14. The process of claim 11 wherein the treated hydrocarbon fraction recovered for introduction to the isocracking zone has an aromatic content of from 30 to 80%.

15. The process of claim 11 wherein the isocracking zone is operated at average instantaneous catalyst temperatures below about 700° F. which induce a conversion in said zone of at least 20% per pass.

References Cited in the file of this patent

UNITED STATES PATENTS

| | | |
|---|---|---|
| 2,459,465 | Smith | Jan. 18, 1949 |
| 2,664,386 | Haensel | Dec. 29, 1953 |
| 2,700,013 | Oblad et al. | Jan. 18, 1955 |
| 2,703,308 | Oblad et al. | Mar. 1, 1955 |
| 2,710,826 | Weikart | June 14, 1955 |
| 2,717,230 | Murray et al. | Sept. 6, 1955 |
| 2,729,596 | Mills | Jan. 3, 1956 |
| 2,739,927 | Doumani | Mar. 27, 1956 |
| 2,765,264 | Pasik | Oct. 2, 1956 |
| 2,772,215 | Hemminger | Nov. 27, 1956 |
| 2,773,007 | Gerhold | Dec. 4, 1956 |
| 2,799,626 | Johnson et al. | July 16, 1957 |
| 2,849,378 | Baker et al. | Aug. 26, 1958 |
| 2,885,346 | Kearby et al. | May 5, 1959 |